US006961351B1

(12) United States Patent
Fukushima et al.

(10) Patent No.: US 6,961,351 B1
(45) Date of Patent: Nov. 1, 2005

(54) COMMUNICATION DEVICE AND TRANSIT DEVICE HAVING A CALL-HOLD FUNCTION AND A METHOD FOR CONTROLLING THE FUNCTION

(75) Inventors: Satoru Fukushima, Konan (JP); Kensuke Kawai, Kasugai (JP); Yasuhiro Tsuchiya, Nagoya (JP); Yasutaka Iwasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1021 days.

(21) Appl. No.: 09/716,763

(22) Filed: Nov. 20, 2000

(30) Foreign Application Priority Data

Feb. 14, 2000 (JP) ............................. 2000-035042

(51) Int. Cl.[7] ................................................. H04J 1/02

(52) U.S. Cl. ...................................... 370/493; 370/252

(58) Field of Search ................................ 370/493, 494, 370/495, 389, 352; 379/93.35, 142.08, 215.01, 379/227

(56) References Cited

U.S. PATENT DOCUMENTS

| | | | |
|---|---|---|---|
| 6,587,553 B1 * | 7/2003 | Shaffer et al. | 379/188 |
| 6,606,668 B1 * | 8/2003 | MeLampy et al. | 709/241 |
| 6,614,784 B1 * | 9/2003 | Glitho et al. | 370/352 |
| 6,757,374 B2 * | 6/2004 | Bardehle | 379/265.09 |

* cited by examiner

*Primary Examiner*—Duc Ho
*Assistant Examiner*—Thien D. Tran
(74) *Attorney, Agent, or Firm*—Kattan Muchin Rosenman LLP

(57) ABSTRACT

The present invention relates to holding a call being executed between communication devices in a communication system which has a first function for a holding party of the communication devices to hold the call by transmitting a first request signal to a held party and a second function for the holding party to hold the call by transmitting a second request signal to the held party and receiving a response signal. The holding party transmits the second request signal first and when the response signal is not returned within a given time, transmits the first request signal. A transit device for relaying a call between communication devices, unless detecting the response signal within a given time after relaying the second request signal, transmits the first request signal to the held party, generates the response signal and transmits the generated response signal to the holding party.

9 Claims, 20 Drawing Sheets

IP-TEL: Internet Telephone
         (VoIP Telephone)
TA: Terminal Adapter

Voice Communication
Directly between EPs

Voice Communication
between EPs via GK

Fig. 7A
PRIOR ART

| ETHER Header (RFC 1042) | IP Header (RFC 791) | TCP Header (RFC 793) | H. 225.0 Q. 931 Header (ITU-T H. 225.0) |
|---|---|---|---|
| | | | H. 245 Header (ITU-T H. 245) |
| | | UDP Header (RFC 768) | RAS Header (ITU-T H. 225.0) |
| | | | RTP Header (ITU-T H. 225.0) |
| | | | RTCP Header (ITU-T H. 225.0) |

Fig. 7B
PRIOR ART

| ProtocolDiscriminator | 08[H] |
|---|---|
| Call Reference | (Number) |
| Message Type | FACILITY |
| Information Element Type | User User Information |

Fig. 8

PRIOR ART

| | |
|---|---|
| Ether Header | Destination MAC Address |
| | Source MAC Address |
| | Protocol:IP |
| | FCS |
| IP Header | Version:4 |
| | Length |
| | Type of service |
| | Packet length |
| | ID |
| | Fragmentation Info |
| | Time to live |
| | Prtocol: UDP |
| | Header checksum |
| | Source address |
| | Destination address |
| UDP Header | Source port |
| | Destination port |
| | length |
| | Checksum |
| RTP Header | Version |
| | P bit/X bit |
| | CSRC Count |
| | |

| |
|---|
| Maker Type bit |
| Payload type |
| Sequence Number |
| Time Stamp |
| Synchronization Source Identifier |
| Payload Data (Voice Info & Holding-Tone Info) |

Near-End Call Hold Method

Remote-End Call Method

COMMUNICATION DEVICE AND TRANSIT DEVICE HAVING A CALL-HOLD FUNCTION AND A METHOD FOR CONTROLLING THE FUNCTION

BACKGROUND OF THE INVENTION

1. Field of the Invention

The present invention relates generally to a communication system, and more particularly to a communication device and a transit device having a call-hold function and a method for controlling the call-hold function.

A technique, called the Internet Telephony, is spreading rapidly in recent years to perform a voice communication by storing voice information in an Internet Protocol (abbreviated to IP) packet as a means to integrate voice with data.

Such services as call hold, call transfer and call diversion are being studied and stipulated recently by the International Recommendations as the supplementary services of the Internet Telephony voice services. The present invention is related to this call hold, which offers such services as to interrupt a speech temporarily and give a holding tone.

Accordingly, an apparatus and a method for performing the call-hold operation effectively and economically is in great demand.

2. Description of the Related Art

The Internet Telephony (or Voice Over IP: VoIP) provides voice services by using the IP message. FIG. 1 shows a configuration of the Internet Telephony system.

An Internet telephone (IP-TEL) or a personal computer (PC) equipped with a microphone (MIC) and a speaker (SPKR) to realize a telephone function performs voice communication by storing voice information in the IP message transmitted in an IP network of a local area network (LAN). It also performs voice communication in the same way over different LANs through a digital exchange network (DGTL EXCH NTWK) and a router for routing a packet in the network.

The IP-TEL and PC (hereinafter, generally called End Point: EP) convert voice information into an IP packet and transmit the packet to the IP network, and also receive an IP packet from the IP network and convert the packet into voice information to output as an audible sound.

A Gate Keeper (hereinafter abbreviated to GK) stores therein and manages the EPs' addresses within the IP network, i.e., IP addresses which correspond to the EPs' telephone numbers (or locally allotted numbers within a LAN) and performs functions such as three-party calling and call diversion.

FIGS. 2A and 2B show system configurations in which the present invention is implemented, wherein an EP (i.e., IP-TEL or PC) performs voice communication directly and through a GK, respectively with a counterpart EP in the Internet Telephony system shown in FIG. 1.

FIGS. 3–6 show the signalling sequence of the call control messages for call set-up, speech, call hold and call disconnect operations conducted on the IP network (refer to ITU-T Recommendations H.225.0 and H.245). The message names conform to the notation used in the Recommendations. There are two call-hold methods stipulated by ITU-T Recommendation H.450.4: method 1 (Near-End Call Hold method) and method 2 (Remote-End Call Hold method).

FIGS. 3 and 4 show the signalling sequence according to methods 1 and 2, respectively when communication takes place directly between the EPs. FIGS. 5 and 6 show the signalling sequence according to methods 1 and 2, respectively when communication takes place between the EPs through the GK.

In a case, too, where communication takes place between the EPs belonging to different LANs, the signalling sequence is the same except that the signals go through a digital network existing between the LANs as shown in FIG. 1. The call hold occurs in the period shown by * in the figures, during which speech is in progress.

FIGS. 7A and 7B show the format of an IP message transmitted within the IP network (for details, refer to the ITU-T Recommendations enclosed in parentheses in the figure). FIG. 7B shows the details of H.225.0 Q.931 Header shown in FIG. 7A, in which the later-described call-hold request and reply signals exchanged between the EPs are specified in the Information Element Type field as User—User Information.

FIG. 8 shows the detailed message for transmitting voice and holding-tone information, which is specified in the RTP Header shown in FIG. 7A. In FIG. 8, the Source address and Destination address of the IP Header show IP addresses of the call originator (calling EP) and terminator (called EP), respectively in the IP network. The voice and holding-tone information is specified as payload data.

When to communicate via the GK, for example, in the IP network based on the aforesaid International Rules, the calling EP requests the GK to set up a call by specifying the telephone numbers of its own and the destination EP in the H.225.0 Q.931 Header. Since the GK previously stores therein and manages the IP addresses corresponding to the phone numbers of EPs, it can recognize the IP addresses of source and destination EPs. Also, as for the aforesaid call-control message, since the GK knows previously the IP addresses of both calling and called EPs, it can perform the call control.

After completion of a call set-up sequence by using the H.225.0 Q.931 Header, the H.245 Header for controlling voice channel information is transmitted. Under control of the H.245 Header, the destination of the voice information (RTP Header) is confirmed between the EPs. On completing the control by the H.245 Header, the EPs exchange the voice information (RTP Header), bypassing the GK.

FIGS. 9A and 9B show the signalling sequence for controlling call hold. Of the two methods for controlling call hold stipulated by ITU-T Recommendation H.450.4, FIG. 9A shows method 1 (Near-End Call Hold method) and FIG. 9B shows method 2 (Remote-End Call Hold method). Although FIGS. 9A and 9B show an example in which the EPs communicate directly with each other, the signalling sequence between the EPs is the same even when they communicate via the GK, since the GK only relays the call-hold control signals.

In FIG. 9A, while voice communication is in progress, the holding EP transmits the Near-End Call Hold request signal (H.225.0 Q.931 FACILITY[holdNotific.inv] message) to forcibly place the held EP in a hold condition. On receipt of the request signal, the held EP recognizes call hold and enters the hold condition. The holing EP further transmits music/video information to the held EP and based on the information, the held EP gives a holding tone or displays an image indicating a call hold.

In FIG. 9B, while voice communication is in progress, the holding EP transmits the Remote-End Call Hold request signal (H.225.0 Q.931 FACILITY[remoteHold.inv] message) to the held EP. The held EP returns the Remote-End Call Hold reply signal (H.225.0 Q.931 FACILITY[remote-Hol d.rr] message) and recognizes call hold. Then, the held EP enters the hold condition and generates music and/or video information by itself to provide music on hold and/or display a video image on hold.

Thus, according to the conventional method, when the call-hold method which the holding EP supports differs from that the held EP supports, especially when the holding EP supports only the Remote-End Call Hold function and the held EP supports only the Near-End Call Hold function, it is a problem that call hold cannot be achieved even though both EPs have the call-hold function.

SUMMARY OF THE INVENTION

It is an object of the present invention to provide a communication device, a transit device and a method that can perform the call-hold function efficiently and economically even when the call hold methods which the holding and held EPs support differs from each other.

To achieve the above and other objects, the present invention is constructed as follows:

(1) In a communication device which performs communication with an other party in a communication network and which has a first function to hold the communication by transmitting a first request signal to the other party and a second function to hold the communication by transmitting a second request signal to the other party and by receiving a response signal, the present invention provides a detector and a hold controller. The detector detects whether the response signal is received within a predetermined time after the second request signal is transmitted. In dependence upon the detecting by the detector, the hold controller generates the first request signal and transmits the generated first request signal to the other party.

(2) In a communication network including a first communication device, a second communication device and a transit device which relays communication between the first and second communication devices, the first communication device having a first function to hold the communication by transmitting a first request signal to the second communication device and a second function to hold the communication by transmitting a second request signal to the second communication device and by receiving a response signal, the present invention provides a detector and a hold controller in the transit device. The detector detects whether the response signal is received within a predetermined time after the second request signal is relayed. In dependence upon the detecting by the detector, the hold controller generates the first request signal and transmits the generated first request signal to the second communication device. It also generates the response signal and transmits the generated response signal to the first communication device.

Therefore, the present invention provides a communication device, a transit-device and a method that can perform the call-hold function efficiently and economically even when the call hold methods which the holding and held communication devices support differ from each other.

BRIEF DESCRIPTION OF THE DRAWINGS

FIGS. 7A and 7B show the format of an IP message transmitted within the IP network;

FIG. 8 shows the detailed message for transmitting voice and holding-tone information;

Throughout the above-mentioned drawings, identical reference numerals are used to designate the same or similar component parts.

DESCRIPTION OF THE PREFERRED EMBODIMENTS

The communication device and transit device having a call-hold function and the method for controlling the call-function of the present invention is explained below, referring to the figures.

Figure 1:
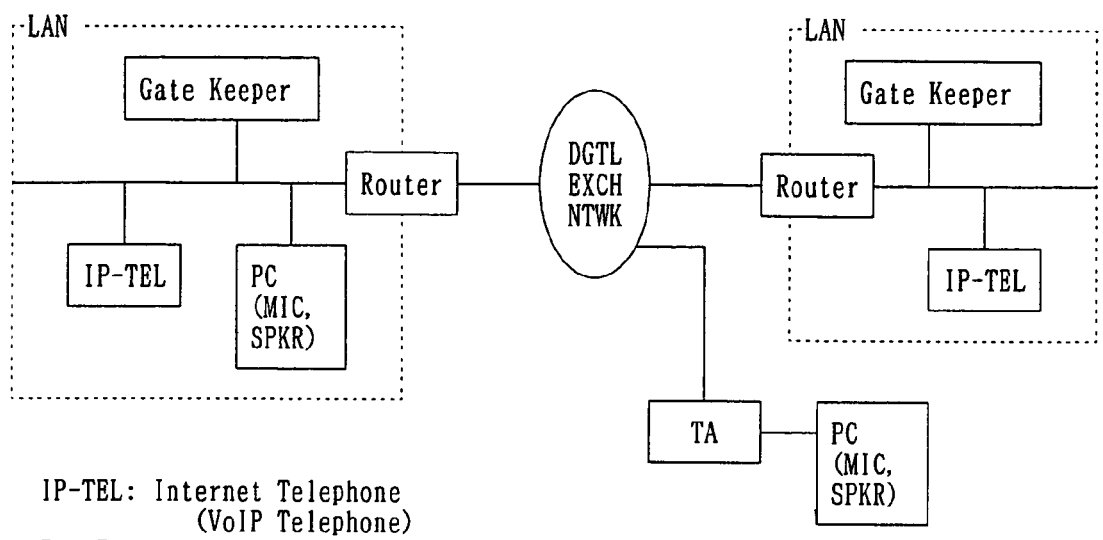
FIG. 1 shows a configuration of the Internet Telephony system.
Figure 2A:
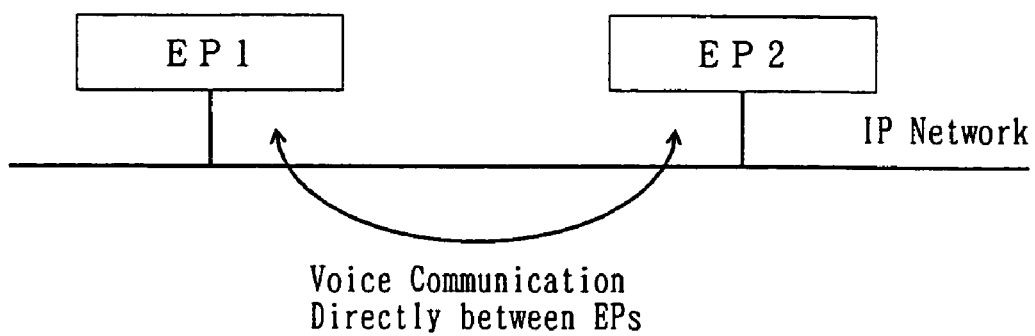
FIGS. 2A and 2B show system configurations in which the present invention is implemented.
Figure 2B:
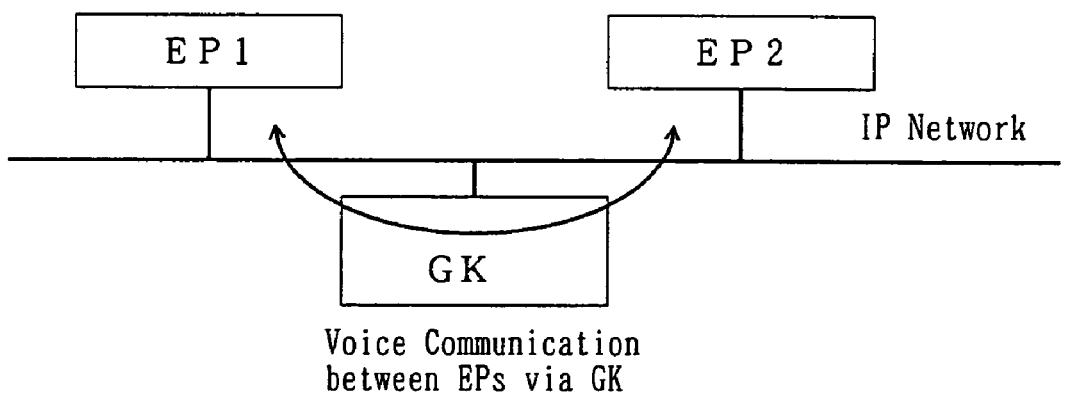
Figure 3:
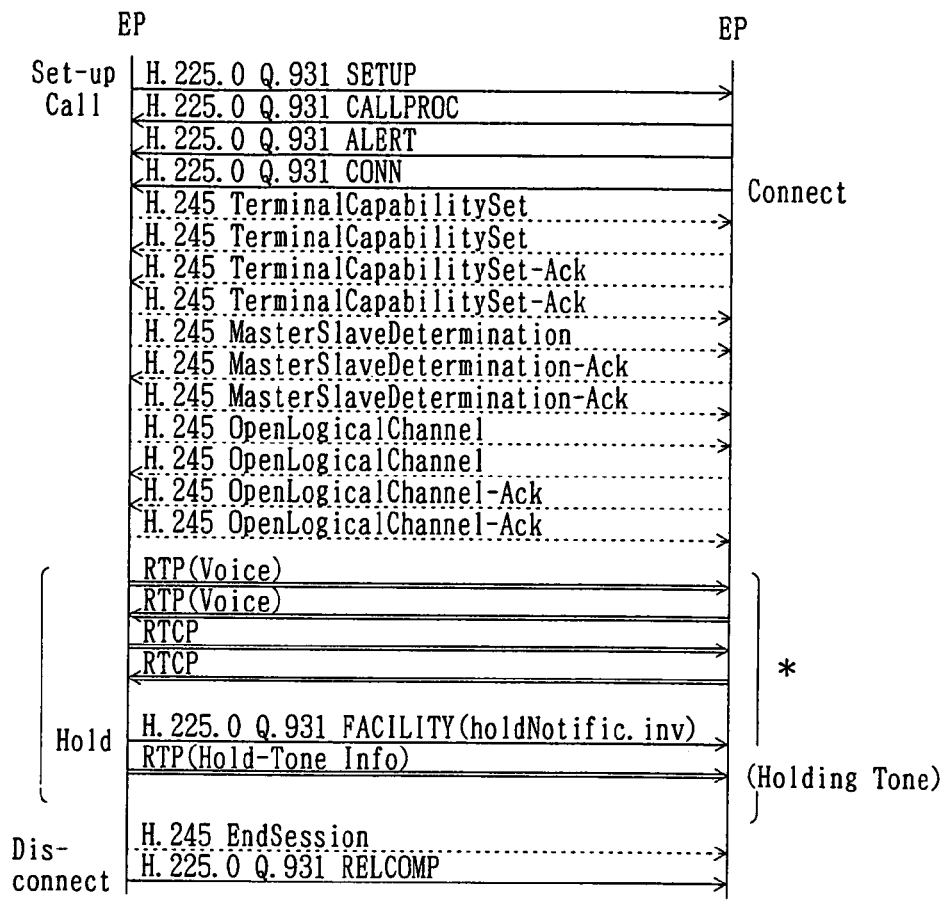
FIGS. 3 and 4 show the signalling sequence according to methods 1 and 2, respectively when communication takes place directly between the EPs.
Figure 4:
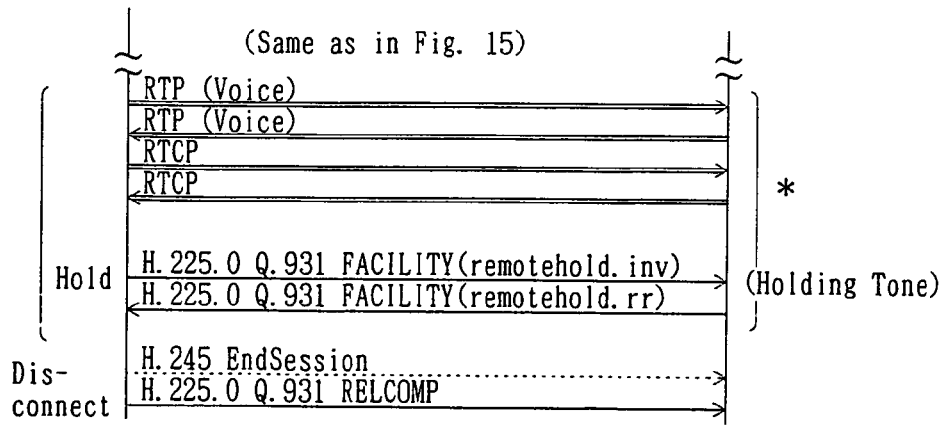
Figure 5:
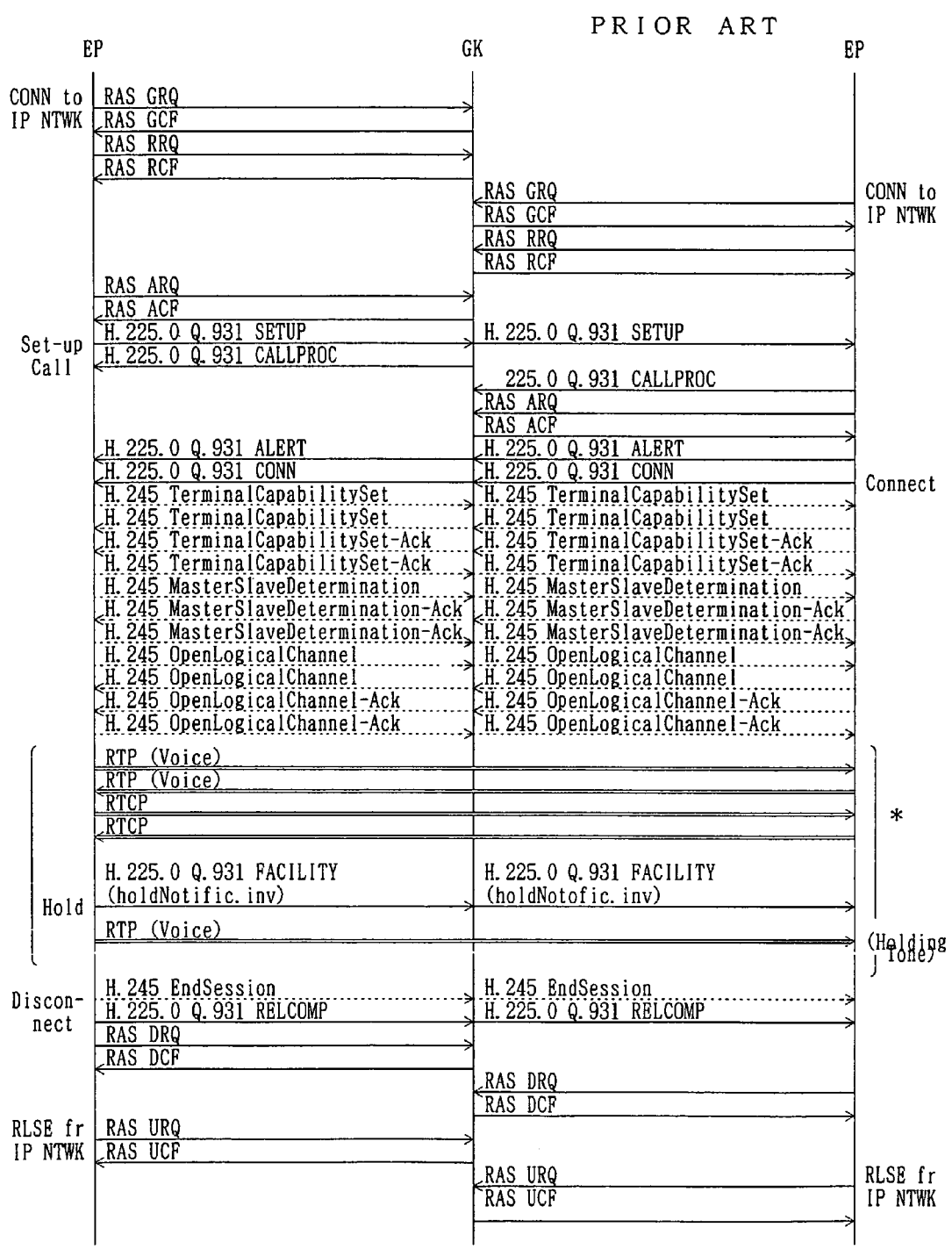
FIGS. 5 and 6 show the signalling sequence according to methods 1 and 2 when communication takes place between the EPs through the GK.
Figure 6:
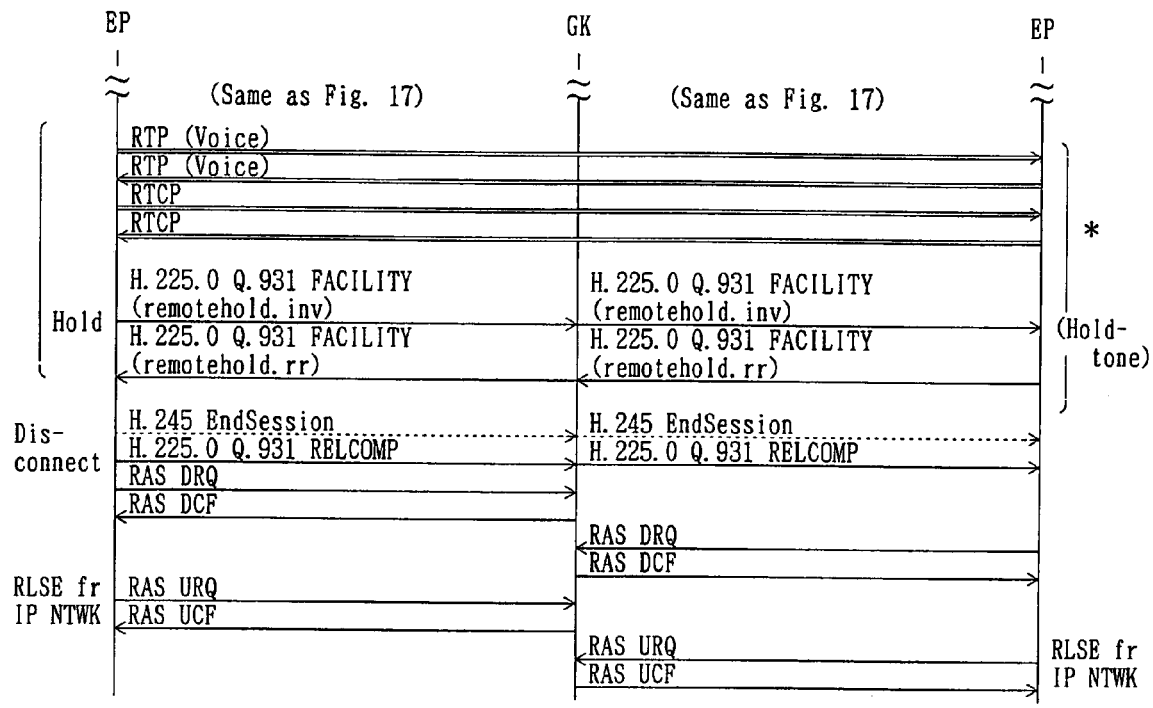
Figure 9A:
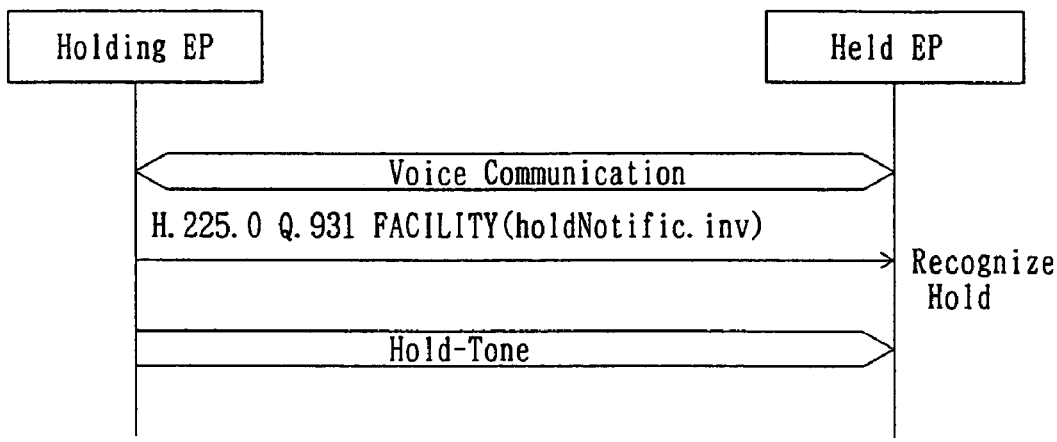
FIGS. 9A and 9B show the signalling sequence for controlling call hold.
Figure 9B:
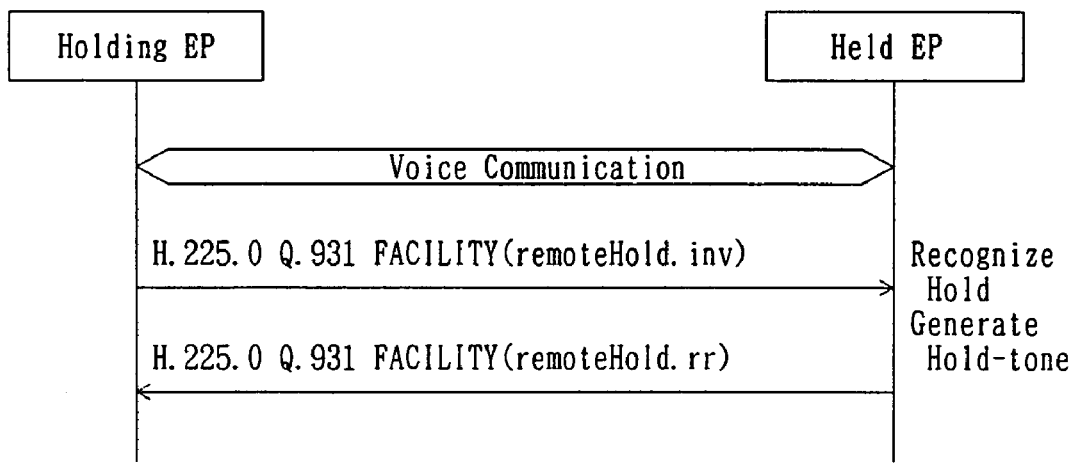
Figure 10A:
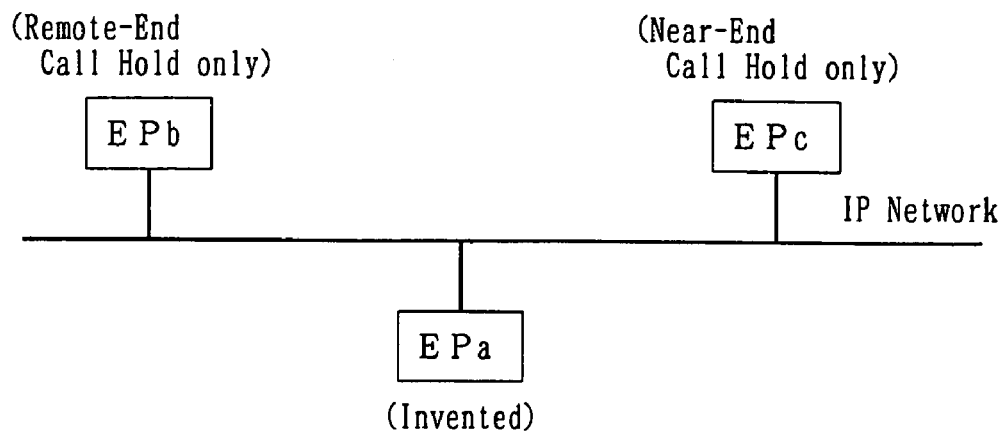
FIGS. 10A and 10B are system-configuration diagrams illustrating the embodiment of the present invention.
Figure 10B:
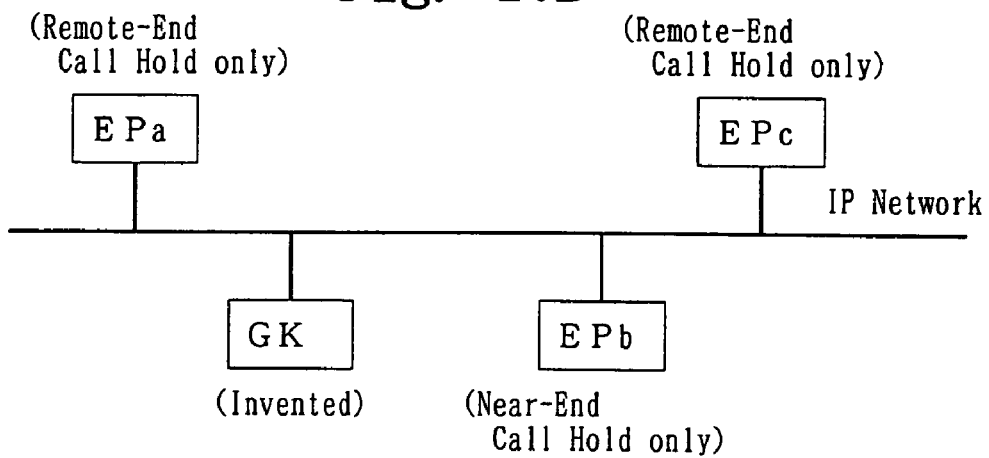

FIGS. 10A and 10B are the system-configuration diagrams for illustrating the first and second embodiment of the present invention, respectively. FIG. 10A shows an example in which End Point EPb supports only the "Remote-End Call Hold" function (or method 2), EPc supports only the "Near-End Call Hold" function (or method 1) and EPa has the function according to the present invention. FIG. 10B shows an example in which both EPa and EPc support only the "Remote-End Call Hold" function (or method 2), EPb supports only the "Near-End Call Hold" function (or method 1) and a Gate Keeper (abbreviated to GK) has the function according to the present invention.

Here, the EP supporting the "Near-End Call Hold" function is defined as follows. As a holding EP, when a "hold" key is activated for example, while a call is in progress, it transmits to the held EP the "Near-End Call Hold" request signal (H.225.0 Q.931 FACILITY[holdNoti fic.inv]message) along with holding-tone information and enters a hold condition. As a held EP, upon receipt of the request signal, it sounds a holding tone based on the received holding-tone information and enters the hold condition.

The EP supporting the "Remote-End Call Hold" function is defined as follows. As a holding EP, when a "hold" key is activated for example, while a call is in progress, it transmits to the held EP the "Remote-End Call Hold" request signal (H.225.0 Q.931 FACILITY[remoteHold. inv] message) and when replied with "Remote-End Call Hold" reply signal (H.225.0 Q.931 FACILITY[remoteHold.rr] message), enters the hold condition. As a held EP, upon receipt of the request signal, it returns the "Remote-End Call Hold" reply signal, generates a holding tone by itself and enters the hold condition.

Figure 11:
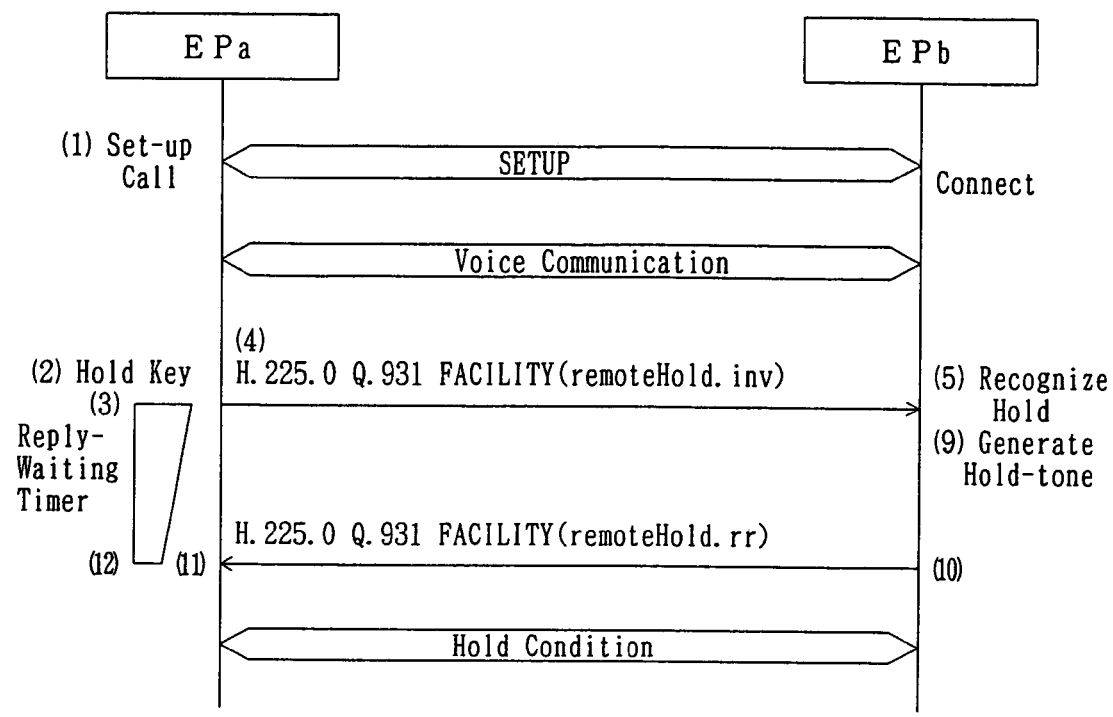
FIG. 11 is a timing chart (part 1) illustrating the operation of the first embodiment of the present invention.

FIG. 11 is a timing chart (part 1) illustrating the operation of the first embodiment of the present invention, in a situation where in FIG. 10A, the holding EPa having the function according to the present invention communicates directly with the held EPb supporting only the Remote-End Call Hold function.

When the "hold" key is activated (2) while the EPa-originated call is in progress (1), the holding EPa transmits to the held EPb the "Remote-End Call Hold" request signal (H.225.0 Q.931 FACILITY[remoteHold. inv] message) and sets a reply-waiting timer (3).

Since the held EPb supports the Remote-End Call Hold function, upon receipt of the request signal, it recognizes hold and enters a hold condition (5). It then sounds a holding tone (9) and replies with the "Remote-End Call Hold reply signal (H.225.0 Q.931 FACILITY[remoteHo ld.rr] message) (10). Upon receipt of the Remote-End Call Hold reply signal (11), the holding EPa resets the timer (12) and enters the hold condition.

Figure 12:
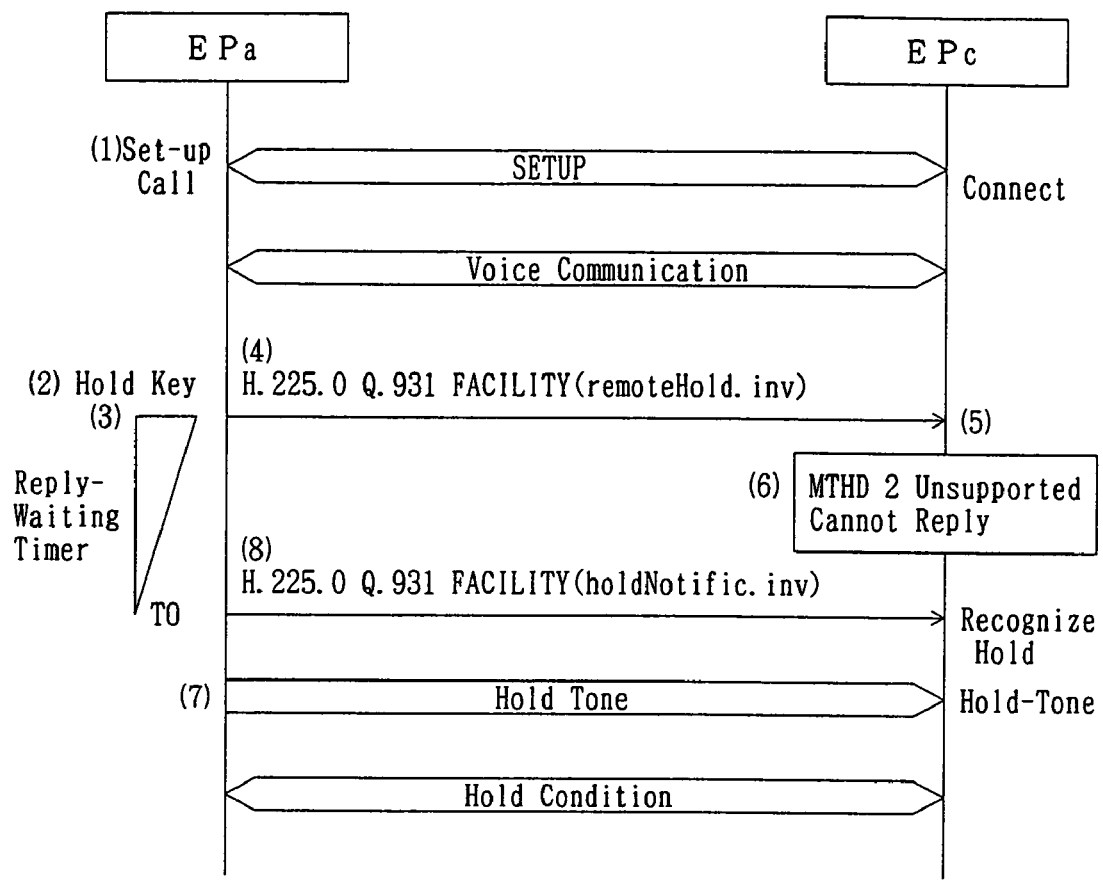
FIG. 12 is a timing chart (part 2) illustrating the operation of the first embodiment of the present invention.

FIG. 12 is a timing chart (part 2) illustrating the operation of the first embodiment of the present invention, in a situation where in FIG. 10A, the holding EPa having the function according to the present invention communicates directly with the held EPc supporting only the Near-End Call Hold function.

When a "hold" key is activated (2) while a EPa-originated call is in progress (1), the holding EPa transmits to the held EPc the "Remote-End Call Hold" request signal (H.225.0 Q.931 FACILITY[remoteHold.inv] message) and sets a reply-waiting timer (3). The EPc, which does not support the Remote-End Call Hold function (or method 2), cannot return the reply signal normally (6).

When the reply-waiting timer detects a timeout (TO) error, the holding EPa transmits to the EPc the Near-End Call Hold request signal (H.225.0 Q.931 FACILITY[hold-Notific.inv] message) (8) and holding-tone information (7). Since the Near-End Call Hold request signal is so stipulated as to forcibly place other party in the hold condition regardless of whether the request signal is to be replied or not, the EPc enters the hold condition and sounds a holding tone according to the transmitted holding-tone information.

Thus, the present invention provides the holding EP with a timer for monitoring the reply signal after transmitting the Remote-End Call Hold request signal and when a timeout error is detected, transmits the Near-End Call Hold request signal and holding-tone information to the intended held EP. Therefore, the present invention can place the held EP in the hold condition, regardless of the call-hold functions the held EP supports and accordingly can solve the aforesaid problems.

Figure 13:
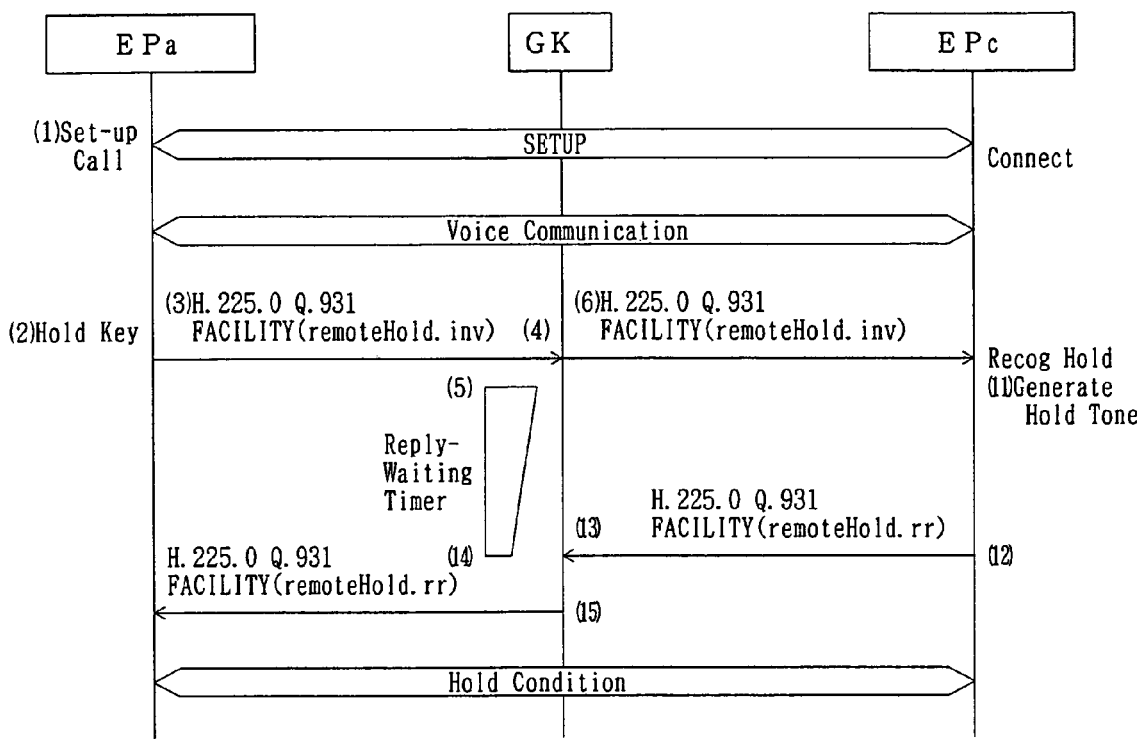
FIG. 13 is a timing chart (part 1) illustrating the operation of the second embodiment of the present invention.

FIG. 13 is a timing chart (part 1) illustrating the operation of the second embodiment of the present invention, in a situation where in FIG. 10B, the holding EPa and the held EPc both supporting only the Remote-End Call Hold function communicate with each other via the GK.

When the "Hold" key is activated (2) while the EPa-originated call is in progress (1), the holding EPa transmits to the GK the Remote-End Call Hold request signal (H.225.0 Q.931 FACILITY[remoteHold.inv] message) (3). The GK forwards the Remote End Call Hold request signal received (4) to the held EPc and sets a reply-waiting timer (5).

On receipt of the Remote-End Call Hold request signal, the held EPc, which supports the Remote-End Call Hold function, generates a holding tone by itself, enters the hold condition (11) and returns the Remote-End Call Hold reply signal (H.225.0 Q.931 FACILITY[remoteHold.rr] message) (12) to the GK.

On receipt of the Remote-End Call Hold reply signal (13), the GK resets the timer (14) and forwards the Remote-End Call Hold reply signal to the held EPa (15). On receiving the Remote-End Call Hold reply signal, the EPa recognizes hold and enters the hold condition itself.

Figure 14:
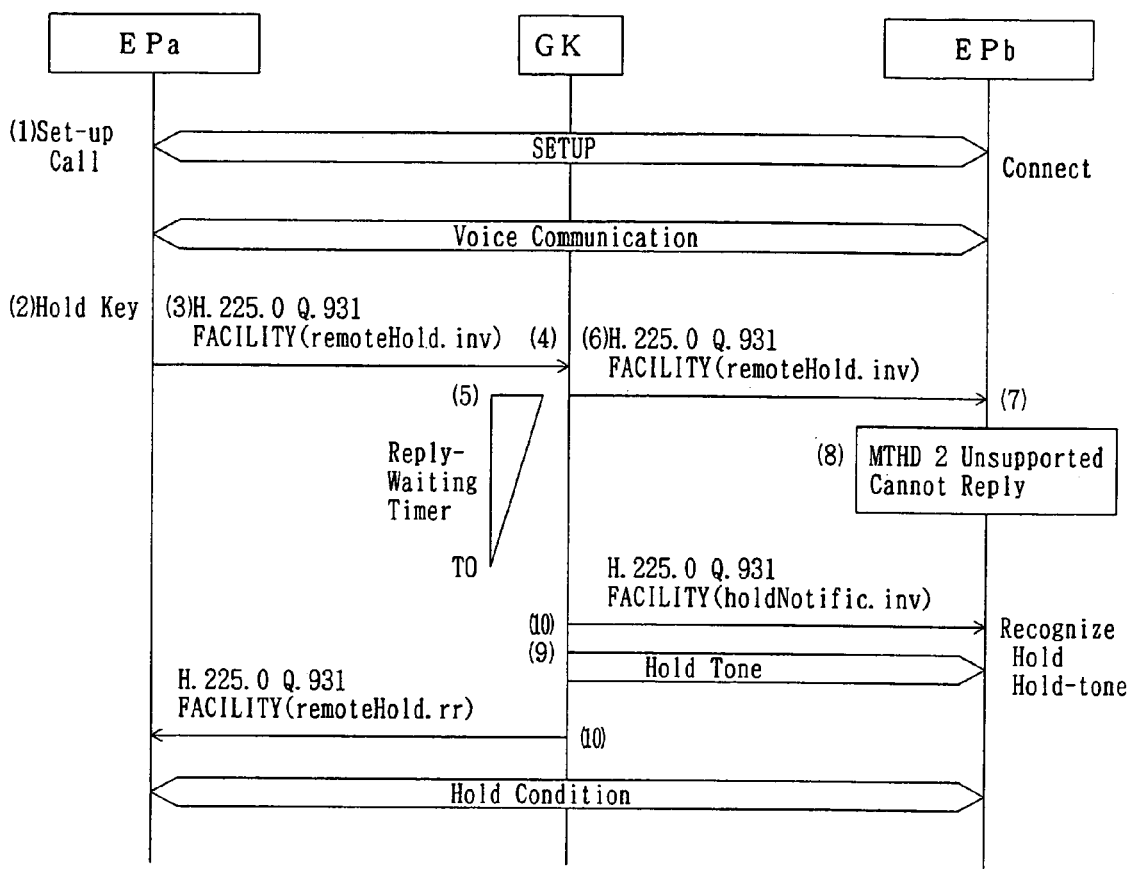
FIG. 14 is a timing chart (part 2) illustrating the operation of the second embodiment of the present invention.

FIG. 14 is a timing chart (part 2) illustrating the operation of the second embodiment of the present invention, in a situation where in FIG. 10B, the holding EPa supporting only the Remote-End Call Hold function communicates with the held EPb supporting only the Near-End Call Hold function though the GK having the function of the present invention.

When the "Hold" key is activated (2) while the EPa-originated call is in progress (1), the holding EPa transmits to the GK the "Remote-End Call Hold" request signal (H.225.0 Q.931 FACILITY[remoteHold.inv] message) (3). The GK forwards the Remote-End Call Hold request signal received (4) to the held EPb (6) and sets a reply waiting timer (5). The held EPb, which does not support the call-hold function (or method 2) for the Remote-End Call Hold request signal received (7), cannot return the reply signal (8).

When the reply-waiting timer detects a timeout error, the GK transmits to the held EPb, the Near-End Call Hold request signal (H.225. 0 Q.931 FACILITY[holdNotific.inv] message) (10) and holding-tone information (9). The GK also transmits the Remote End-Call Hold reply signal (H.225.0 Q.931 FACILITY[remoteHold.rr] message) (10) to the holding EPa.

Since the Near-End Call Hold request forcibly instructs call hold regardless of whether the request is to be replied or not, the held EPb enters the hold condition and sounds a holding tone according to the received holding-tone information. Upon receiving the Remote-End Call Hold reply signal, the holding EPa recognizes that the held EPb has entered the hold condition and enters the hold condition itself.

Thus, the present invention provides the GK with the timer for monitoring the reply signal and when a timeout error is detected by the timer, the GK transmits to the held EP the Near-End Call Hold request signal to force the held EP into hold. At this time, the GK further generates the Remote-End Call Hold reply signal and transmits the generated reply signal to the holding EP, to make the held EP look apparently as having the Remote-End Call Hold function and having returned the reply signal. Accordingly, the present invention can put an intended EP in the hold condition irrespective of the call-hold functions the held EP supports and therefore, solve the aforesaid problems.

Figure 15:
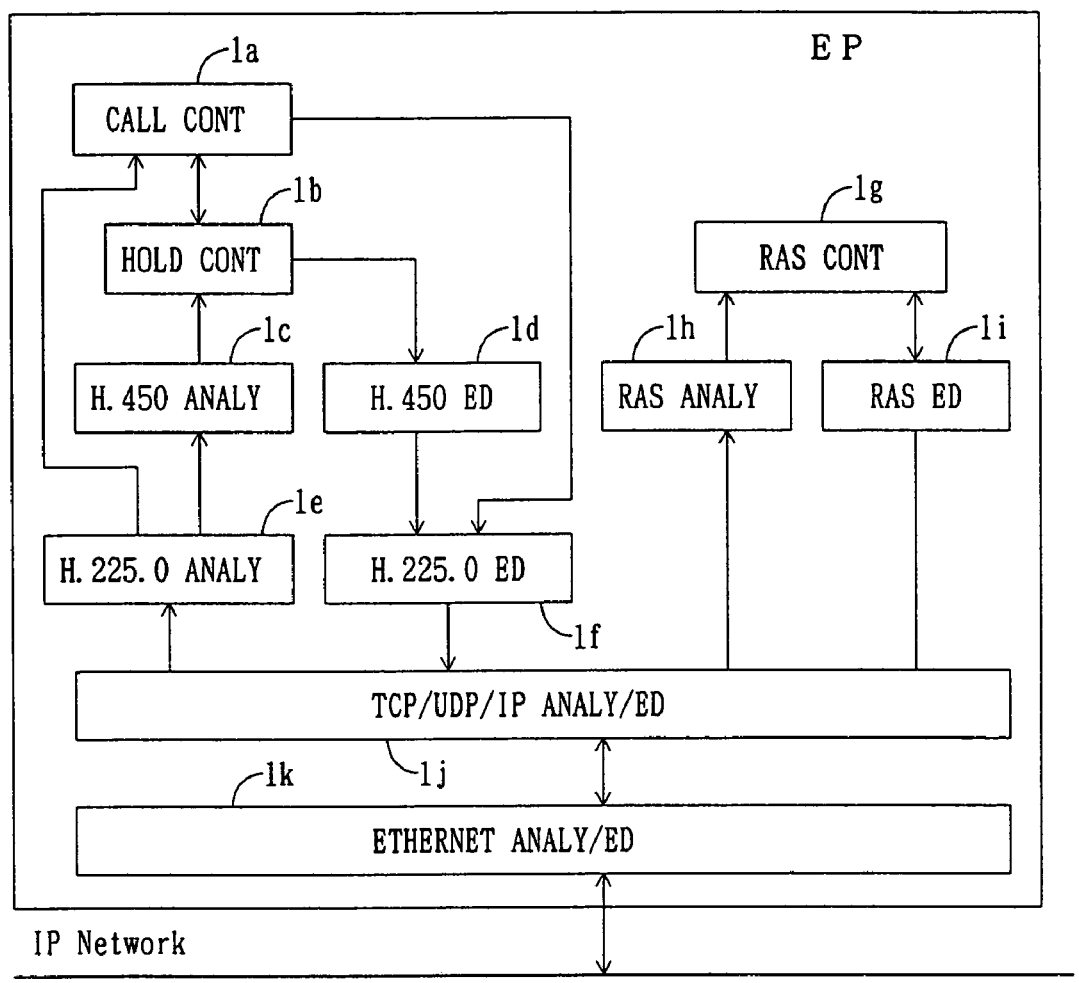
FIG. 15 and FIG. 16 are block diagrams of the EP and the GK respectively, of the embodiment of the present invention.
Figure 16:
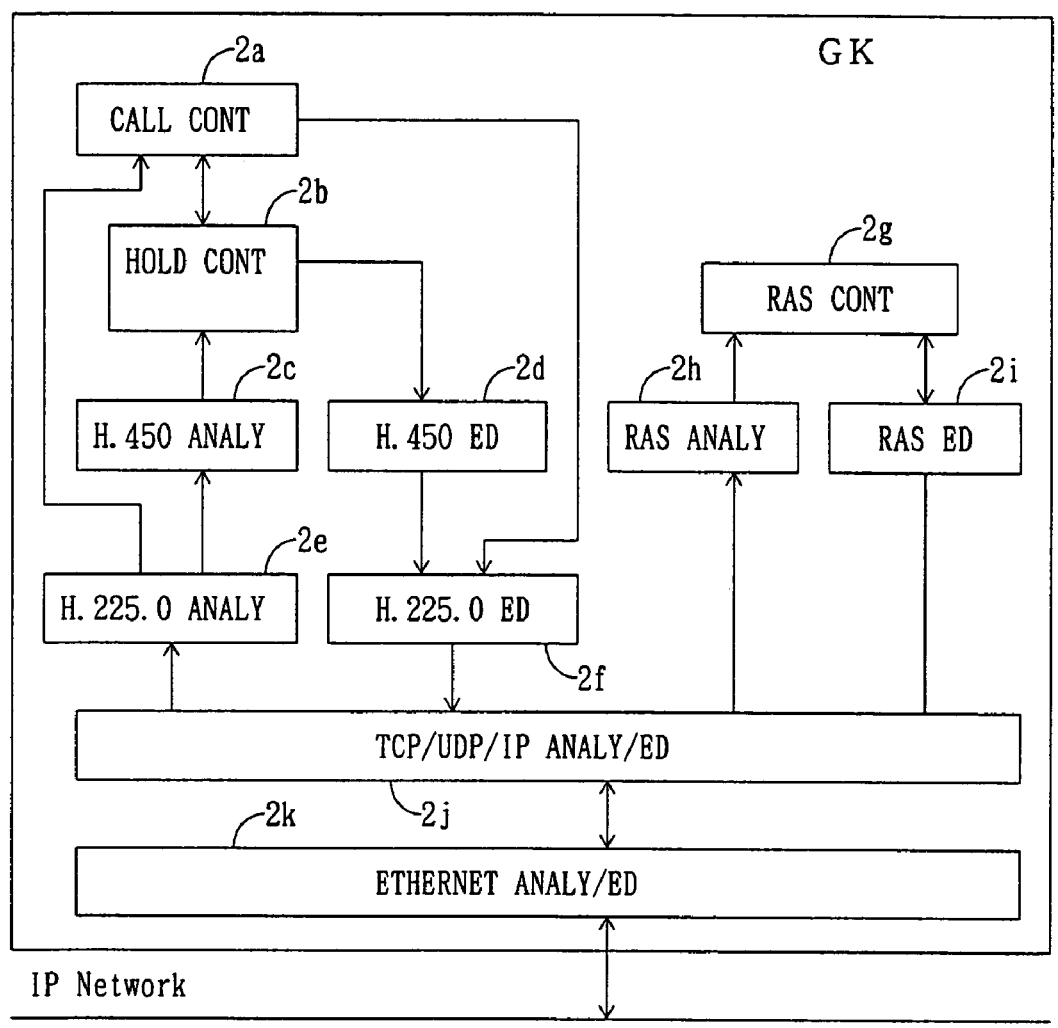

FIGS. 15 and 16 are block diagrams of the EP and GK respectively, of the embodiment of the present invention. The EP has the same configuration as the GK and the reference numerals for the GK are parenthesized in the following description.

The EP (GK) of the present invention is comprised of a call controller 1a (2a), a hold controller 1b (2b), an H.225.0 analyzer 1e (2e), an H.450 analyzer 1c (2c), an H.225.0 editor 1f (2f), an H.450 editor 1d (2d), a TCP/UDP/IP analyzer-editor 1j (2j) and an ETHERNET analyzer-editor 1k (2k).

For the known RAS (Registration, Admission and Status) functions, the EP (GK) is further comprised of an RAS controller 1g (2g), an RAS analyzer 1h (2h) and an RAS editor 1i (2i). In conjunction with the GK, the EP, when to newly connect with an IP network, registers its own phone number and the corresponding IP address in the GK by using RAS messages and when to originate a call, obtains from the GK the destination IP address corresponding to the called EP's phone number by using the RAS messages. In order to achieve the above-mentioned RAS function, the RAS controller 1g (2g) controls the overall operations of the RAS functions. The RAS analyzer 1h (2h) analyzes the received RAS messages and the RAS editor 1i (2i) edits the RAS messages to be transmitted.

The call controller 1a (2a) performs basic call control operations. The hold controller 1b (2b) performs call control for call hold. That is, the hold controller 1b (2b) is provided with a timer (not shown) for monitoring the Remote-End Call Hold reply signal and when a timeout error is detected, outputs the Near-End Call Hold request signal to forcibly place the intended EP in the hold condition to accomplish the aforesaid call-hold functions of the present invention.

The H.225.0 analyzer 1e (2e) analyzes a received call control message according to the Recommendation H.225.0 to notify the call controller 1a (2a) of the analyzed result. The H.450 analyzer 1c (2c) analyzes a received hold control message according to the Recommendation H.450 to notify the hold controller 1b (2b) of the analyzed result.

The H.225.0 editor 1f (2f) responsive to an instruction from the call controller 1a (2a), edits the call-control message according to Recommendation H.225.0 to output the edited message to the TCP/UDP/IP analyzer-editor 1j (2j). The H.450 editor 1d (2d) responsive to an instruction from the hold controller 1b (2b), edits the hold-control message according to Recommendation H.450 to output the edited message to the TCP/UDP/IP analyzer-editor 1j (2j).

The TCP/UDP/IP analyzer-editor 1j (2j) analyzes the TCP/UDP/IP-format message input from the ETHERNET analyzer-editor 1k (2k) to report the analyzed result to the H.225.0 analyzer 1e (2e), H.450 analyzer 1c (2c) and RAS analyzer 1h (2h). It also converts the messages edited by the H.225.0 editor 1f (2f), H.450 editor 1d (2d) and RAS editor 1i (2i) into the TCP/UDP/IP-format to output the converted messages to the ETHERNET analyzer-editor 1k (2k).

The ETHERNET analyzer-editor 1k (2k) analyzes a message received from the IP network and notifies the TCP/UDP/IP analyzer-editor 1j (2j) of the analyzed result. It also converts the TCP/UDP/IP-format messages output from the TCP/UDP/IP analyzer-editor 1j (2j) into the ETHERNET-format messages and outputs the converted messages to the IP network.

Figure 17:
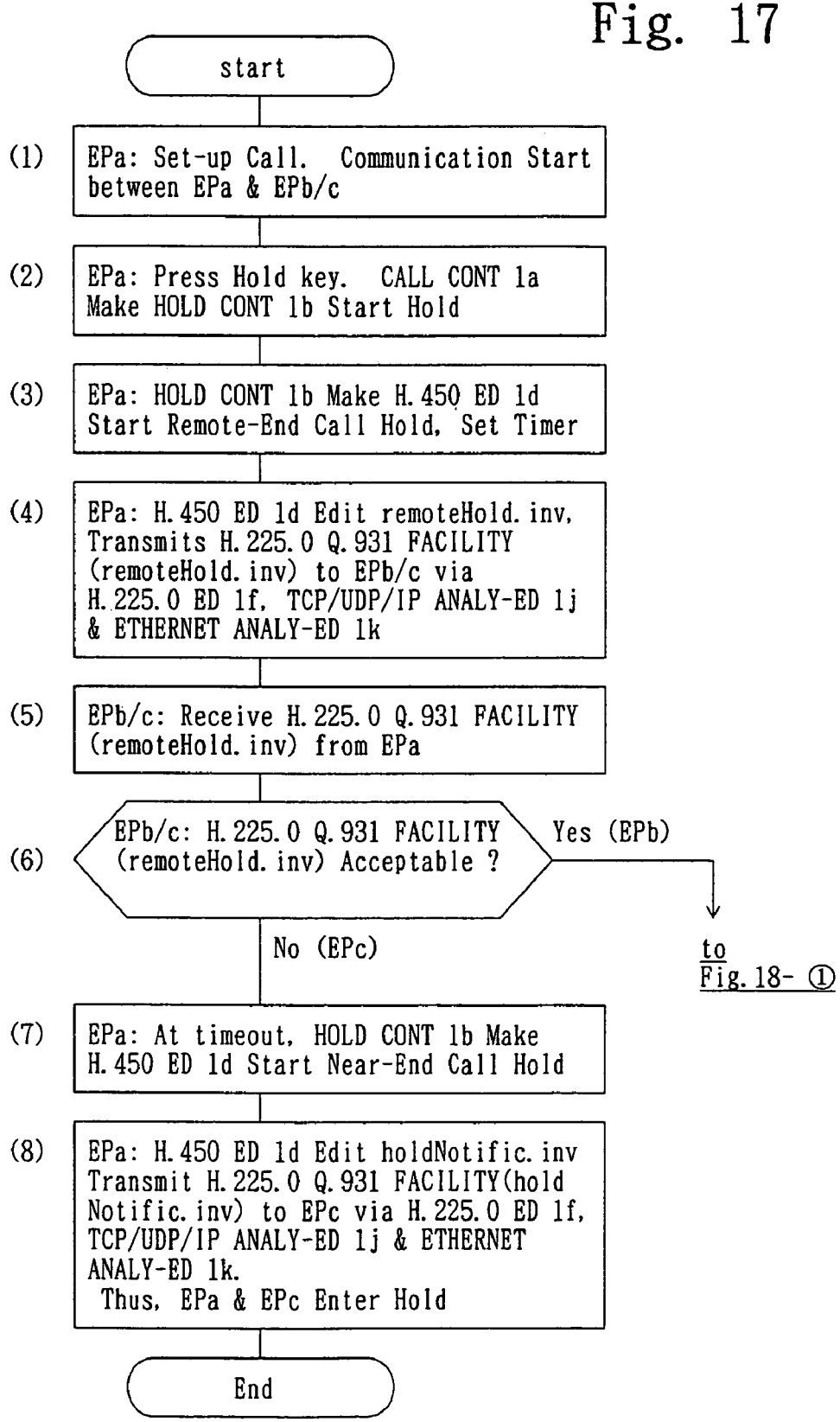
FIGS. 17–18 are flowcharts illustrating the operation of the EP of the embodiment of the present invention.
Figure 18:
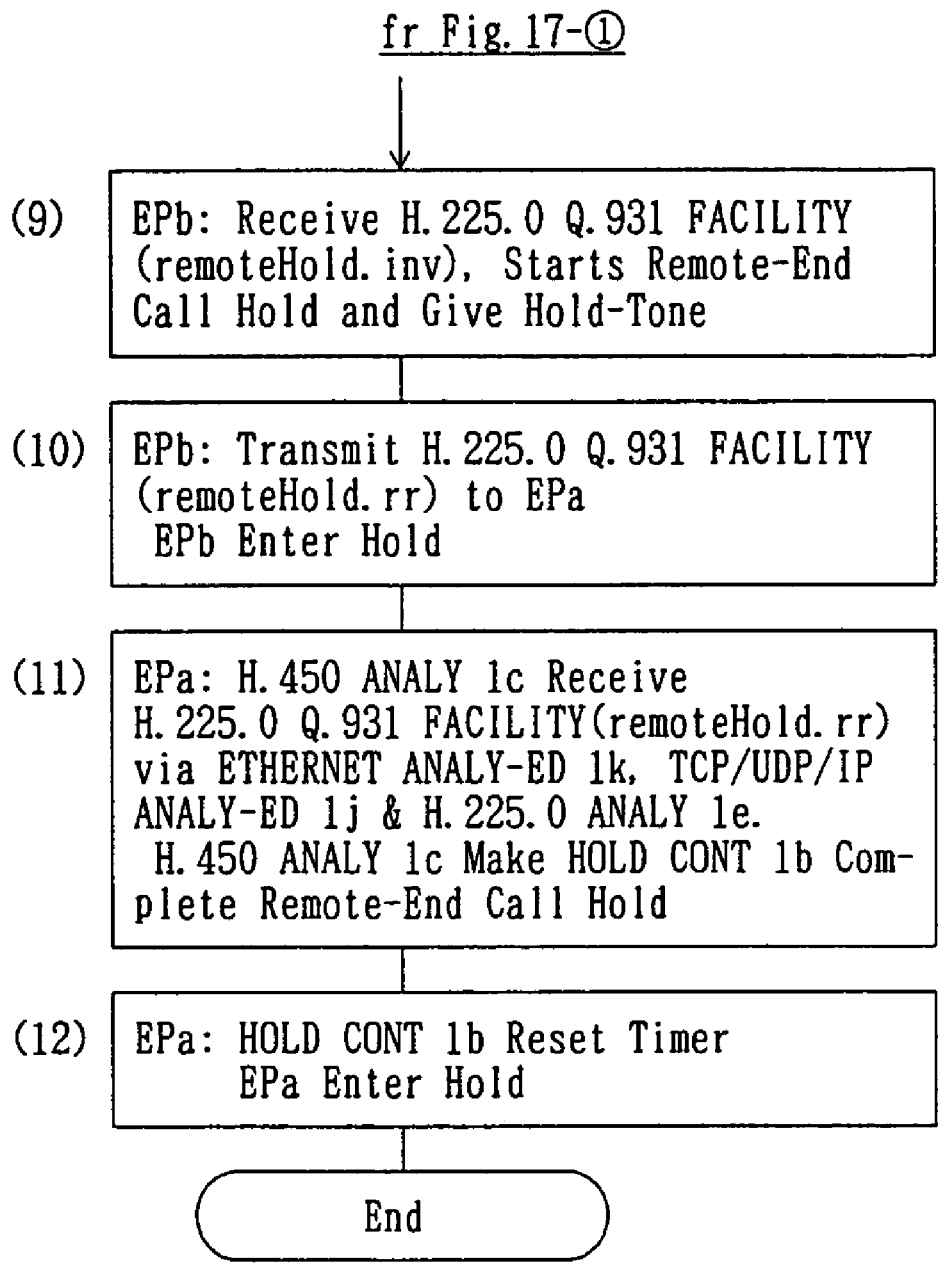

FIGS. 17–18 are flowcharts illustrating the operation of the EP of the embodiment of the present invention. The operations of functional units of the EP shown in FIG. 15 are detailed based on FIGS. 17–18, referring to the timing charts of FIGS. 11–12. In the timing charts of FIGS. 11–12 and the flow charts of FIGS. 17–18, the same parenthesized reference numbers are given to the corresponding operations.

(1) When the EPa originates a call, voice communication starts between the EPa and EPb/c (EPb/c represents the EPb or the EPc depending on the call-hold functions it supports).

(2) In the EPa, when the Hold key (not shown) is pressed, the call controller 1a instructs the hold controller 1b to start the Remote-End Call Hold operation.

(3) As instructed by the hold controller 1b, the hold controller 1b instructs the H.450 editor 1d to start the Remote-End Call Hold operation and sets the reply-waiting timer.

(4) As instructed by the hold controller 1b, the H.450 editor 1d edits the "remoteHold.inv" message, which is subjected to respective editions (or conversions) through the H.225.0 editor If, TCP/UDP/IP analyzer-editor 1j and ETHERNET analyzer-editor 1k and then transmitted to the EPb/c as the H.225.0 Q.931 FACILITY(remoteHold.inv) message.

(5) The EPb/c receives the H.225.0 Q.931 FACILITY (remoteHold.inv) message from the EPa.

(6) If the H.225.0 Q.931 FACILITY (remoteHold.inv) message is acceptable (i.e., the EPb), the processing goes to step (9); otherwise (i.e., the EPc) to step (7).

(7) In the EPa, when a timeout error is detected by the reply-waiting timer, the hold controller 1b instructs the H.450 editor 1d to start the Near-End Call Hold operation.

(8) As instructed by the hold controller 1b, the H.450 editor 1d edits the "holdNotific.inv" message, which is subjected to respective editions (conversions) through the H.225.0 editor 1f, TCP/UDP/IP analyzer-editor 1j and ETHERNET analyzer-editor 1k and then transmitted to the EPc as the H.225.0 Q.931 FACILITY(holdNotific.inv) message along with holding-tone information. Thus, the EPa and EPc enter the hold condition.

(9) In the EPb, on receipt of the H.225.0 Q.931 FACILITY(remoteHol d.inv) message, the H.450 analyzer 2c instructs the hold controller 1b to start the Remote-End Call Hold operation. Then, the hold controller 1b instructs the H.450 editor 1d to complete the Remote-End Call Hold and gives a holding-tone on a speaker.

(10) The EPb-H.450 editor 1d edits the "remoteHold.rr" message to transmit the H.225.0 Q.931 FACILITY(remoteHold.rr) message to the EPa. Thus, the EPb is placed in the hold condition.

(11) In the EPa, the H.450 analyzer 1c receives from the EPb the H. 225.0 Q.931 FACILITY(remoteHold.rr) message which has previously been subjected to respective analyses through the ETHERNET analyzer-editor 1k, TCP/UDP/IP analyzer-editor 1j and H.225.0 analyzer 1e. The H.450 analyzer 1c instructs the hold controller 1b to complete the Remote-End Call Hold operation.

(12) As instructed by the H.450 analyzer 1c, the hold controller 1b resets the reply-waitin timer and enters the hold condition.

Figure 19:
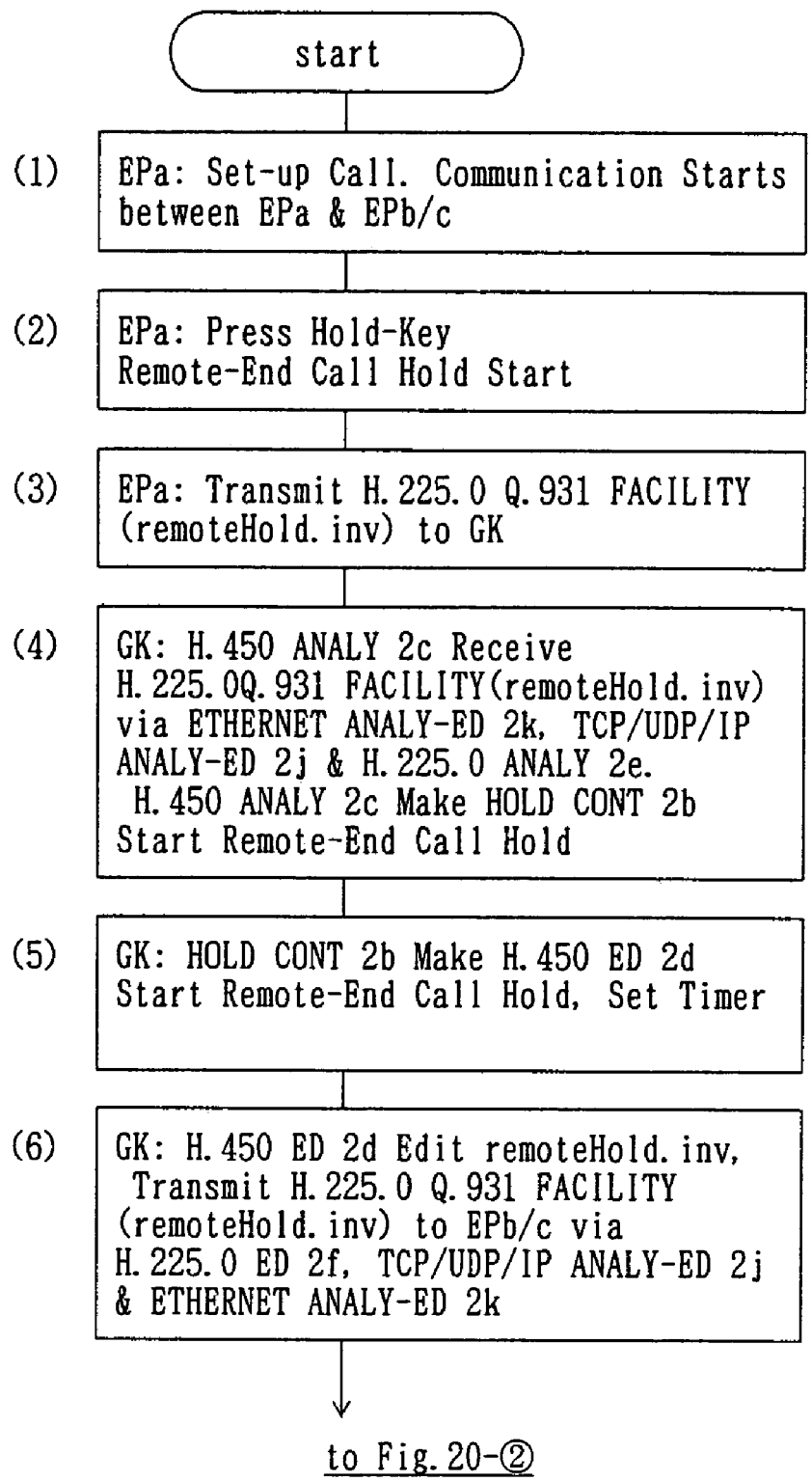
FIGS. 19–21 are flowcharts illustrating the operation of the GK of the embodiment of the present invention.
Figure 20:
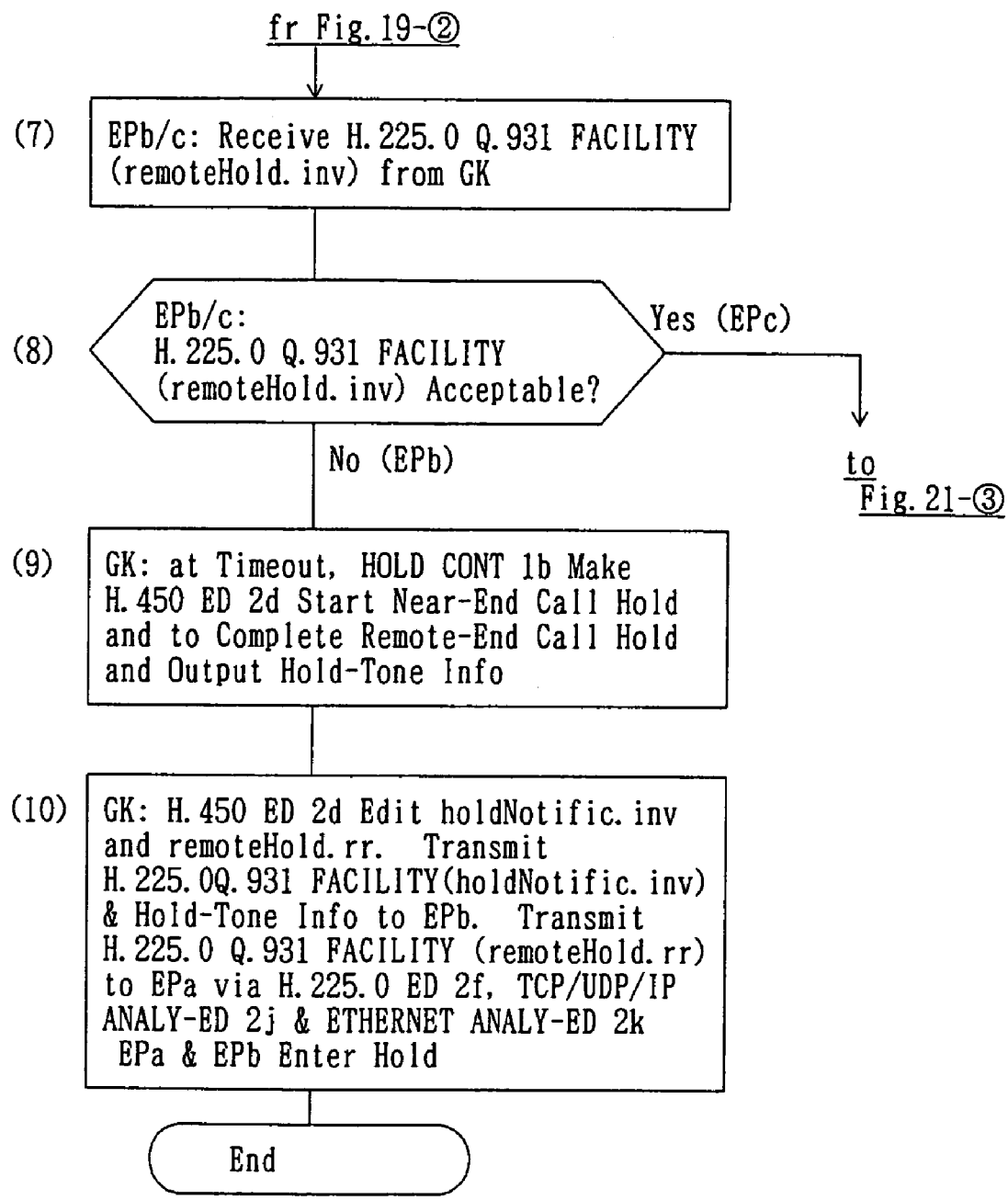
Figure 21:
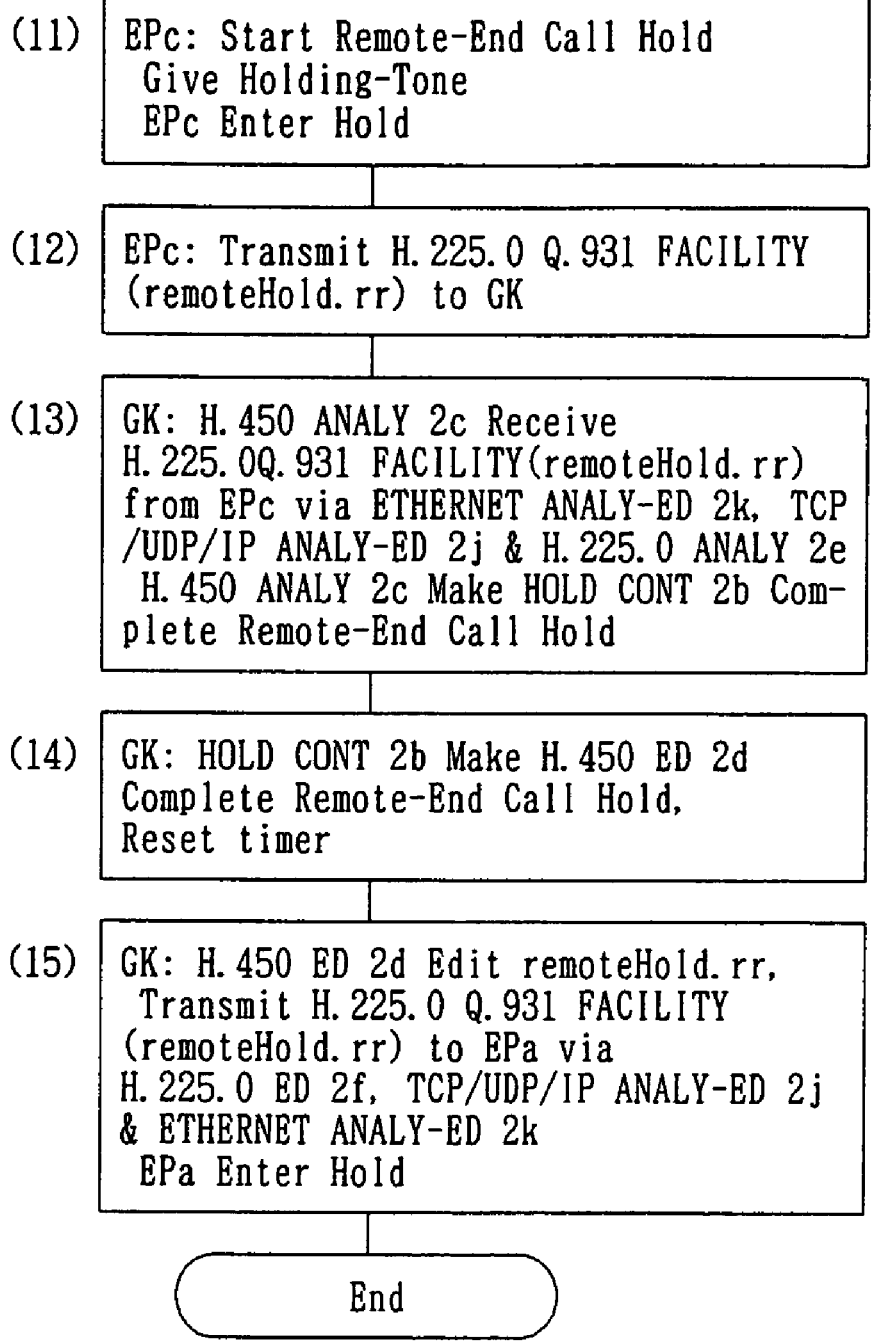

FIGS. 19–21 are flowcharts illustrating the operation of the GK of the embodiment of the present invention. The operations of functional units of the GK shown in FIG. 16 are detailed based on FIGS. 19–21, referring to the timing charts of FIGS. 13–14. In the timing charts of FIGS. 13–14 and the flow charts of FIGS. 19–21, the same parenthesized reference numbers are given to the corresponding operations.

(1) When the EPa originates a call, voice communication starts between the EPa and EPb/c through the GK (EPb/c represents the EPb or the EPc depending on the call-hold functions it supports).

(2) In the EPa, when the Hold key is pressed, the call controller 1a instructs the hold controller 1b to start the Remote-End Call Hold operation and then the hold controller 1b instructs the H.450 editor 1d to start the same operation.

(3) The H.450 editor id edits the "remoteHold.inv" message, which is subjected to respective editions (conversions) through the H.225.0 editor 1f, TCP/UDP/IP analyzer-editor 1*j* and ETHERNET analyzer-editor 1*k* and then transmitted to the GK as the H.225.0 Q.931 FACILITY(remoteHold.inv) message.

(4) In the GK, the H.450 analyzer 2*c* receives from the EPa the H.225.0 Q.931 FACILITY(remoteHold.inv) message which has previously been subjected to respective analyses through the ETHERNET analyzer-editor 2*k*, TCP/UDP/IP analyzer-editor 2*j* and H.225.0 analyzer 2*e*. Then, the H.450 analyzer 2*c* instructs the hold controller 2*b* to start the Remote End Call Hold operation.

(5) As instructed by the H.450 analyzer 2*c*, the hold controller 2*b* instructs the H.450 editor 2*d* to start the Remote-End Call Hold operation and sets the reply-waiting timer.

(6) As instructed by the hold controller 2*b*, the H.450 editor 2*d* edits the "remoteHold.inv" message, which is subjected to respective editions (conversions) through the H.225.0 editor 2*f*, TCP/UDP/IP analyzer-editor 2*j* and ETHERNET analyzer-editor 2*k* and then transmitted from the GK to the EPb/c as the H.225.0 Q.931 FACILITY(remoteHold.inv) message.

(7) In the EPb/c, the H.450 analyzer 1*c* receives from the GK, the H.225.0 Q.931 FACILITY(remoteHold.inv) message which has previously been subjected to respective analyses through the ETHERNET analyzer-editor 1*k*, TCP/UDP/IP analyzer-editor 1*j* and H.225.0 analyzer 1*e*.

(8) If the H.225.0 Q.931 FACILITY (remoteHold.inv) message is acceptable (i.e., the EPc), the processing goes to step (11); otherwise (i.e., the EPb) to step (9).

(9) In the GK, on detecting a timeout error in the reply-waiting timer, the hold controller 2*b* instructs the H.450 editor 2*d* to start the Near-End Call Hold operation and to complete the Remote-End Call Hold operation and outputs the holding-tone information to the H.450 editor 2*d*.

(10) In the GK, according to the respective instructions in step (9), the H.450 editor 2*d* edits the "holdNotific.inv" message and the remoteHold.rr" message, which are subjected to editions (conversions) through the H.225.0 editor 2*f*, TCP/UDP/IP analyzer-editor 2*j* and ETHERNET analyzer-editor 2*k* and then transmitted to the EPb as the H.225.0 Q.931 FACILITY(holdNotific.inv) message and to the EPa as the H.225.0 Q.931 FACILITY(remoteHold.rr) message, respectively. Thus, the EPa and EPb enter the hold condition.

(11) In the EPc, on receipt of the H.225.0 Q.931 FACILITY(remoteHo ld.inv) message from the GK, the H.450 analyzer 2*c* instructs the hold controller 1*b* to start the Remote-End Call Hold operation. Then, the hold controller 1*b* instructs the H.450 editor 1*d* to complete the Remote-End Call Hold operation and gives a holding-tone on a speaker. Thus, the EPc is placed in the hold condition.

(12) As instructed by the hold controller 1*b*, the H.450 editor 1*d* edits the "remoteHold.rr" message, which is subjected to respective editions (conversions) through the H.225.0 editor 2*f*, TCP/UDP/IP analyzer-editor 2*j* and ETHERNET analyzer-editor 2*k* and then transmitted to the GK as the H.225.0 Q.931 FACILITY(remoteHold.rr) message.

(13) In the GK, the H.450 analyzer 2*c* receives from the EPc the H.225.0 Q.931 FACILITY(remoteHold.rr) message which has-previously been subjected to respective analyses through the ETHERNET analyzer-editor 2*k*, TCP/UDP/IP analyzer-editor 2*j* and H.225.0 analyzer 2*e*. Then, the H.450 analyzer 2*c* instructs the hold controller 2*b* to complete the Remote-End Call Hold operation.

(14) As instructed by the H.450 analyzer 2*c*, the hold controller 2*b* instructs the H.450 editor 2*d* to complete the Remote-End Call Hold operation and resets the reply-waiting timer.

(15) As instructed by the hold controller 2*b*, the H.450 editor 2*d* edits the "remoteHold.rr" message, which is subjected to respective editions (conversions) through the H.225.0 editor 2*f*, TCP/UDP/IP analyzer-editor 2*j* and ETHERNET analyzer-editor 2*k* and then transmitted to the EPa as the H.225.0 Q.931 FACILITY(remoteHold.rr) message. Thus, the EPa enters the hold condition.

According to the present invention as described above, even when a holding-party communication device (EP) differs from a held-party communication device in the call-hold methods they support, both communication devices can perform the call-hold function effectively and economically.

What is claimed is:

1. A VoIP communication device which performs communication with an other party in a communication network and which has a first function to hold the communication by transmitting a first request signal to the other party and a second function to hold the communication by transmitting a second request signal to the other party and by receiving a response signal, said communication device comprising:
    detection means for detecting whether the response signal is received within a predetermined time after the second request signal is transmitted; and
    hold control means, when said predetermined time passes without detecting said response signal is received by said detection means, for generating the first request signal and transmitting the generated first request signal to the other party.

2. The communication device according to claim 1, wherein the first request signal is accompanied by a signal indicating a hold condition.

3. The communication device according to claim 1 respectively,
    wherein the first request, second request and response signals are FACILITY[holdNotific.inv], FACILITY[remoteHold.inv] and FACILITY [remote Hold.rr] messages respectively, of the ITU-T Recommendation H.225.0 Q.931.

4. In a VoIP communication network including a first communication device, a second communication device and a transit device which relays communication between the first and second communication devices, the first communication device having a first function to hold the communication by transmitting a first request signal to the second communication device and a second function to hold the communication by transmitting a second request signal to the second communication device and by receiving a response signal, said transit device comprising:
    detection means for detecting whether the response signal is received within a predetermined time after the second request signal is relayed; and
    hold control means, when said predetermined time passes without detecting said response signal is received by said detection means, for generating the first request signal and transmitting the generated first request signal to the second communication device and for generating the response signal and transmitting the generated response signal to the first communication device.

5. The transit device according to claim 4,
    wherein the first request signal is accompanied by a signal indicating a hold condition.

6. The transit device according to claim 4,
wherein the first request, second request and response signals are FACILITY[holdNotific.inv], FACILITY[remoteHold.inv] and FACILITY[remote Hold.rr] messages respectively, of the ITU-T Recommendation H.225.0 Q.931.

7. A VoIP communication-holding method for a communication device which performs communication with an other parry in a communication network, the communication device having a first function to hold the communication by transmitting a first request signal to the other party and a second function to hold the communication by transmitting a second request signal to the other party and receiving a response signal, said method comprising the steps of:
   detecting whether the response signal is received within a predetermined time after the second request signal is transmitted; and
   transmitting the first request signal to the other party when said predetermined time passes without detecting said response signal is received in said detecting.

8. The communication-holding method according to claim 7,
wherein the first request, second request and response signals are FACILITY[holdNotific.inv], FACILITY[remoteHold.inv] and FACILITY[remote Hold.rr] messages respectively, of the ITU-T Recommendation H.225.0 Q.931.

9. A VoIP communication-holding method for a transit device which relays communication between first and second communication devices in a communication network, the first communication device having a first function to hold the communication by transmitting a first request signal to the second communication device and a second function to hold the communication by transmitting a second request signal to the second communication device and receiving a response signal from the second communication device, said method comprising the steps of:
   detecting whether the response signal is received within a predetermined time after the second request signal is relayed; and
   when said predetermined time passes without detecting said response signal is recieved in said detecting, transmitting the first request signal to the second communication device and generating the response signal and transmitting the generated response signal to the first communication device.

\* \* \* \* \*